United States Patent
Shim et al.

(10) Patent No.: US 7,110,620 B2
(45) Date of Patent: Sep. 19, 2006

(54) APPARATUS FOR PROCESSING DIGITAL IMAGE AND METHOD THEREFOR

(75) Inventors: Woo-sung Shim, Hwasung-gun (KR); Sung-kyu Choi, Gwangmyung (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 765 days.

(21) Appl. No.: 10/226,256

(22) Filed: Aug. 23, 2002

(65) Prior Publication Data
US 2003/0052977 A1    Mar. 20, 2003

(30) Foreign Application Priority Data
Sep. 14, 2001    (KR) .............................. 2001-56935

(51) Int. Cl.
*G06K 9/32* (2006.01)
(52) U.S. Cl. ................. 382/300; 345/660; 345/698; 348/581; 358/428; 358/451; 358/525; 708/208; 708/290
(58) Field of Classification Search ........ 345/696–699, 345/660–671; 382/277, 298–300; 348/441, 348/571, 581, 582, 704; 358/428, 451, 525; 708/208, 290
See application file for complete search history.

(56) References Cited

U.S. PATENT DOCUMENTS

| | | | | |
|---|---|---|---|---|
| 4,661,987 A | * | 4/1987 | Anderson et al. | 382/277 |
| 5,140,648 A | * | 8/1992 | Hackett et al. | 382/299 |
| 5,142,374 A | * | 8/1992 | Tajika et al. | 358/3.1 |
| 5,239,585 A | | 8/1993 | Restle | 381/7 |
| 5,581,680 A | | 12/1996 | Sfarti et al. | 395/143 |
| 5,594,675 A | | 1/1997 | Peng | 364/724.1 |
| 5,809,182 A | | 9/1998 | Ward et al. | 382/278 |
| 6,175,430 B1 | * | 1/2001 | Ito | 358/525 |
| 6,188,803 B1 | | 2/2001 | Iwase et al. | 382/300 |
| 6,279,020 B1 | * | 8/2001 | Dujardin et al. | 708/316 |

FOREIGN PATENT DOCUMENTS

| | | |
|---|---|---|
| JP | 05-191722 | 7/1993 |
| JP | 11-168664 | 6/1999 |
| JP | 2000-092385 | 3/2000 |

OTHER PUBLICATIONS

"Resampling Algorithms For Image Resizing And Rotation", Joseph Ward et al., Proceedings of the SPIE, SPIE, Bellingham, VA, U.S., vol. 1075, 1989, pp. 260-269, XP009022083.

(Continued)

*Primary Examiner*—Bhavesh M. Mehta
*Assistant Examiner*—Manav Seth
(74) *Attorney, Agent, or Firm*—Staas & Halsey LLP

(57) ABSTRACT

An apparatus which processes a digital image and a method therefor which can reduce an error when calculating an output value obtained by interpolating pixel values of the input digital image. The apparatus includes an interpolation processing unit which interpolates an input digital image, and a controller which measures an interpolation interval of pixel values of the digital image, calculates a coefficient by substituting the interpolation interval for a coefficient equation stored in a register, and calculates an interpolation node for the digital image by substituting the coefficient and an output pixel position value of the digital image for an interpolation node calculation equation. The controller controls the interpolation processing unit so as to interpolate the digital image to the interpolation node. As a result, it is possible to reduce an error between an interpolated output pixel position value and an output pixel position value for the pixel values of the input digital image.

18 Claims, 10 Drawing Sheets

OTHER PUBLICATIONS

European Search Report issued Jan. 11, 2005 from the European Patent Office with respect to corresponding European Patent Application No. 02256364.7, filed Sep. 13, 2002.

Japanese Office Action issued on Oct. 4, 2005, in Japanese Application 2002-269021 which corresponds to U.S. Appl. No. 10/226,256.

* cited by examiner

APPARATUS FOR PROCESSING DIGITAL IMAGE AND METHOD THEREFOR

CROSS-REFERENCE TO RELATED APPLICATIONS

This application claims the benefit of Korean Patent Application No. 2001-56935 filed on Sep. 14, 2001, in the Korean Industrial Property Office, the disclosure of which is incorporated herein by reference.

BACKGROUND OF THE INVENTION

1. Field of the Invention

The present invention relates to an apparatus which processes a digital image and a method therefor, and more particularly, to an apparatus which processes a digital image and a method therefor which can enlarge or reduce the digital image photographed by an image collecting apparatus such as a digital camera.

2. Description of the Related Art

FIG. 1 shows a conventional apparatus which processes a digital image. For example, digital image pixel data is input from a frame store memory (not shown) to the apparatus for digital image processing. The input digital image pixel data is interpolated by the apparatus, which processes the digital image, and output through a printer (not shown) or stored in another frame store memory (not shown) for a later processing.

The conventional apparatus which processes the digital image includes a controller 100, a vertical direction interpolation coefficient memory 101, a vertical direction interpolation input buffer 103, a vertical direction interpolation circuit 105, a vertical direction interpolation output buffer 107, a horizontal direction interpolation circuit 109, and a horizontal direction interpolation coefficient memory 111.

The controller 100 controls the vertical direction interpolation coefficient memory 101, the vertical direction interpolation input buffer 103, the vertical direction interpolation circuit 105, the vertical direction interpolation output buffer 107, the horizontal direction interpolation circuit 109, and the horizontal direction interpolation coefficient memory 111, so as to interpolate pixel values of the input digital image.

The vertical direction interpolation input buffer 103 temporarily stores the pixel values of the input digital image, and is embodied in a First-In First-Out (FIFO). Here, the FIFO is a method of processing program operation requests which processes a first request first (i.e., a firstly-input pixel value of the digital image).

At least one interpolation coefficient which creates an equation that represents a position of an output pixel, which is an interpolation node, is stored in the vertical direction interpolation coefficient memory 101 and the horizontal direction interpolation coefficient memory 111. The interpolation coefficients of the respective output pixel positions are calculated according to a distance between the pixel values of the input digital image, an increment interval between the pixel positions of the output digital image, and an interpolation method in the respective output pixel positions. In addition, a series of the pixel values of the input digital image are multiplied by the corresponding interpolation coefficients, thereby interpolating the pixel values of the input digital image.

When receiving a vertical direction interpolation processing signal by the controller 100, the vertical direction interpolation circuit 105 obtains vertical direction interpolation coefficients corresponding to the pixel values of the input digital image from the vertical direction interpolation coefficient memory 101, respectively multiplies the pixel values of the digital image by the vertical direction interpolation coefficients corresponding to the pixel values, and calculates a sum of the resulting values to perform the vertical direction interpolation. The pixel values of the digital image interpolated in a vertical direction by the vertical direction interpolation circuit 105 are stored in the vertical direction interpolation output buffer 107.

The horizontal direction interpolation circuit 109 receives the pixel values of the digital image interpolated in a vertical direction from the vertical direction interpolation output buffer 107. In addition, the horizontal direction interpolation circuit 109 obtains horizontal direction interpolation coefficients corresponding to the pixel values of the input digital image from the horizontal direction interpolation coefficient memory 111. Thereafter, the horizontal direction interpolation circuit 109 respectively multiplies the pixel values of the digital image interpolated in the vertical direction by the horizontal direction interpolation coefficients obtained from the horizontal direction interpolation coefficient memory 111, and calculates a sum of the resulting values to perform the horizontal direction interpolation. Accordingly, the horizontal and vertical direction interpolations of the pixel values of the input digital image are completed.

A variety of filters, such as bilinear, spline and cubic filters, which enlarge or reduce the digital image, are required to interpolate the digital image. Enlargement or reduction of the digital image by the filters should satisfy ideal filter properties. However, it is impossible to embody such an ideal filter. In FIG. 1, a sync function type filter is used, and a cubic convolution of FIG. 1 uses a shape shown in FIG. 2.

The convolution of FIG. 2 is represented by Formula 1:

$$R_c(x) = \begin{cases} (a+2)|x|^3 - (a+3)|x|^2 + 1 & 0 \le |x| \le 1 \\ a|x|^3 - 5a|x|^2 + 8a|x| - 4a & 1 \le |x| \le 2 \end{cases} \quad <\text{Formula 1}>$$

wherein, when 'a=−½' is satisfied, Formula 1 is represented by Formula 2:

$$u(x) = \begin{cases} \frac{3}{2}|x|^3 - \frac{5}{2}|x|^2 + 1 & 0 < |x| < 1 \\ -\frac{1}{2}|x|^3 + \frac{5}{2}|x|^2 - 4|x| + 2 & 1 < |x| < 2 \\ 0 & 2 < |x| \end{cases} \quad <\text{Formula 2}>$$

FIG. 3 illustrates an interpolation method by the cubic convolution of FIG. 2. Assuming that an interval of the respective periods is '1', an interpolation node $Y_p$ is represented by Formula 3 according to a boundary condition:

$$Y_p = \begin{cases} \left[-\frac{1}{2}(1+t)^3 + \frac{5}{2}(1+t)^2 - 4(1+t) + 2\right]Y_{k-1} + & \text{<Formula 3>} \\ \left[\frac{3}{2}(t)^3 - \frac{5}{2}t^2 + 1\right]Y_k + \\ \left[\frac{3}{2}(1-t)^3 - \frac{5}{2}(1-t^2) + 1\right]Y_{k+1} + \\ \left[-\frac{1}{2}(2-t)^3 + \frac{5}{2}(2-t)^2 - 4(2-t) + 2\right]Y_{k+2} \end{cases}$$

Formula 4 is obtained by processing Formula 3 as a function of 't'. Here, $Y_{k-1}$, $Y_k$, $Y_{k+1}$ and $Y_{k+2}$ indicate positions of k-1, k, k+1 and k+2-th sampled output pixels of the input digital image, respectively.

$$Y_p = \{(Y_{k+2} - 3Y_{k+1} + 3Y_k - Y_{k-1})/2\}t^3 + \qquad \text{<Formula 4>}$$
$$\{(-Y_{k+2} + 4Y_{k+1} - 5Y_k + 2Y_{k-1})/2\}t^2 +$$
$$\{(Y_{k+2} - 2Y_{k-1})/2\}t + Y_k$$

Formula 5 is obtained by processing Formula 4:

$$Y_p = C_1 Y_{k-1} + C_2 Y_k + C_3 Y_{k+1} + C_4 Y_{k+2}$$

$$C_1 = (-t^3 + 2t^2 - t)/2$$

$$C_2 = (3t^3 - 5t^2 + 2)/2$$

$$C_3 = (-3t^3 + 4t^2 + t)/2$$

$$C_4 = (t^3 - t^2)/2 \qquad \text{<Formula 5>}$$

Here, the respective coefficients $C_1$, $C_2$, $C_3$ and $C_4$ can use a lookup table.

However, when the apparatus is embodied in a form of hardware, in a scaler such as the cubic convolution, it takes a long processing time to apply the above Formula(s) to each scale value. In addition, as shown in FIG. 4, a lot of adders and multipliers are required to express the respective interpolation coefficients in the form of hardware. Thus, a bank is generally used as shown in FIG. 5. Here, the bank is a logical unit which divides a main memory device for management. The bank is used to prepare for an increase of the main memory device or to utilize a limited memory device space by bank switching. The more banks are used, the higher the performance. Although a small number of adders and multipliers are required when the banks are used, rather than the use of the Formula(s), so far as the memory is not infinite, the bank obtains approximate values. Accordingly, such an error influences the overall image quality. Moreover, buses are more frequently used due to memory access.

That is, in the cubic convolution using N banks, the respective banks are used with a representative value, thus generating an error. For example, when values between 0 and 1 are divided by five banks, the values are divided at an interval of 0.2. When $Y_p$ exists between 0 and 0.2, a distance 't' between 0 and 1 in the cubic convolution filter is set up to be 0.1, to calculate the values $C_1$, $C_2$, $C_3$ and $C_4$. Accordingly, values between 0 and 0.2 are approximated to 0.1, which may generate an error. FIGS. 6A, 6B, 6C and 6D illustrate an error distribution of the cubic convolution of FIG. 3 and probable errors of the respective coefficients.

Referring to FIGS. 6A to 6D, the coefficients are divided by 1/N periods during N bank periods, and an error value of each period is reduced due to an increase of N. In addition, when the coefficients having errors are respectively multiplied by the pixel values, the interpolated pixel values have bigger errors. For example, assuming that 't' is 0.19 and the pixel value of the digital image represented by (255 255 1 1) belongs to a first bank, the representative value of 't' becomes 0.1, and thus the interpolated pixel value becomes 283. However, since 't' is 0.19, the interpolated pixel value calculated by using the actual 't' is 216. Accordingly, an error value of 67 is generated between the pixel value interpolated by the representative value of 't' of the bank and the pixel value interpolated by the actual 't'.

FIG. 7 shows a flowchart illustrating a conventional method of processing a digital image. As shown in FIG. 7 with reference to FIG. 1, the controller 100 calculates a size ratio of the pixel value of the input digital image to an aimed pixel value to be interpolated by the vertical direction interpolation circuit 105 and the horizontal direction interpolation circuit 109 in operation 1001. That is, when the horizontal direction is X and the vertical direction is Y, X scale is X size of the original digital image/X size of the aimed digital image, and Y scale is Y size of the original digital image/Y size of the aimed digital image.

After calculating X and Y scales, the controller 100 measures $Y_{k-1}$, $Y_k$, $Y_{k+1}$ and $Y_{k+2}$ in operation 1003. Here, $Y_{k-1}$, $Y_k$, $Y_{k+1}$ and $Y_{k+2}$ indicate positions of the k-1, k, k+1 and k+2-th sampled output pixels of the input digital image, respectively. After measuring $Y_{k-1}$, $Y_k$, $Y_{k+1}$ and $Y_{k+2}$, the controller 100 obtains 't' from the scale size in operation 1005. Here, 't' represents an X axis interval between the pixel value of the input digital image and the interpolation node, namely an interpolation interval. After calculating 't', the controller 100 obtains coefficients from the corresponding memories, the vertical direction interpolation coefficient memory 101 and the horizontal direction interpolation coefficient memory 111 according to 't' in operation 1007. As described above, the vertical direction interpolation coefficient memory 101 and the horizontal direction interpolation coefficient memory 111 store the coefficients for variables which indicate the positions of the output pixels sampled in the interpolation node calculation equation.

The controller 100 calculates the interpolation node $Y_p$ according to the obtained coefficient in operation 1009. In addition, the controller 100 interpolates the input digital image by using the calculated interpolation node in operation 1011. Accordingly, interpolation of the input digital image is completed.

However, the conventional apparatus which processes the digital image and the method therefor require many adders and multipliers in a form of hardware, and also require many banks to obtain precise values. Moreover, when a number of the banks is restricted, the respective banks store the representative values of the interpolation intervals. As a result, an error is generated between the pixel value by the actual interpolation interval 't' and the pixel value by the representative value thereof.

SUMMARY OF THE INVENTION

Accordingly, it is an object of the present invention to provide an apparatus which processes a digital image and a method therefor which can decrease a processing time by reducing memory access in a cubic convolution filter, and prevent an error between a pixel value by an actual interpolation interval 't' and an interpolated pixel value.

Additional objects and advantages of the invention will be set forth in part in the description which follows and, in part, will be obvious from the description, or may be learned by practice of the invention.

To achieve the above and other objects of the present invention, there is provided an apparatus which processes a digital image, comprising an interpolation processing unit which interpolates an input digital image, and a controller which measures an interpolation interval of pixel values of the digital image, calculates a coefficient by substituting the measured interpolation interval for a coefficient equation stored in a register, and calculates an interpolation node for the digital image by substituting the coefficient and an output pixel position value of the digital image for an interpolation node calculation equation, wherein the controller controls the interpolation processing unit so as to interpolate the digital image to the interpolation node.

According to an aspect of the present invention, the coefficient equation is represented by and satisfies the following relationship:

$$C_n(t) = a_{kn}t + b_{kn}$$

where $C_n$ denotes the coefficient of a variable of a position of an output pixel indicating an n-th input digital image in an equation representing the position of the output pixel which is the interpolation node, t denotes the interpolation interval, $a_{kn}$ is stored in a k-th register and represents a gradient of a straight line passing a position of an output pixel of an n-1th input digital image and the position of the output pixel of the n-th input digital image with respect to a predetermined interpolation interval, $b_{kn}$ is stored in the k-th register and represents an intersecting point between the straight line passing the position of the output pixel of the n-1th input digital image and the position of the output pixel of the n-th input digital image with respect to the predetermined interpolation interval and Y axis, and 'k=1, 2, 3, . . . , k, . . .' and 'n=2, 3, 4, . . . , n, . . . .'

According to another aspect of the present invention, the interpolation node calculation equation is represented by and satisfies the following relationship:

$$Y_p = Y_{n-1}C_{n-1} + Y_nC_n + Y_{n+1}C_{n+1} + Y_{n+2}C_{n+2}$$

where $Y_p$ denotes the interpolation node of the input digital image, $Y_n$ denotes a position of an n-th sampled output pixel of the input digital image, $C_n$ is the coefficient of the position of the n-th sampled output pixel of the input digital image, and 'n=2, 3, 4, . . . , n, . . . .'

To achieve the above and other objects of the present invention, there is provided a method of processing a digital image, the method comprising measuring an interpolation interval of pixel values of an input digital image, calculating a coefficient by substituting the interpolation interval for a coefficient equation stored in a register, calculating an interpolation node for the digital image by substituting the coefficient and an output pixel position value of the digital image on an interpolation node calculation equation, and controlling an interpolation processing unit so as to interpolate the digital image to the interpolation node.

Accordingly, it is not necessary to use a large number of adders and multipliers in the present invention. Furthermore, the processing time of the controller of the present apparatus can be decreased by reducing the access time of the memory.

BRIEF DESCRIPTION OF THE DRAWINGS

These and other objects and advantages of the present invention will become apparent and more readily appreciated from the following description of the embodiments, taken in conjunction with the attached drawings in which.

DETAILED DESCRIPTION OF THE PREFERRED EMBODIMENTS

Figure 1:
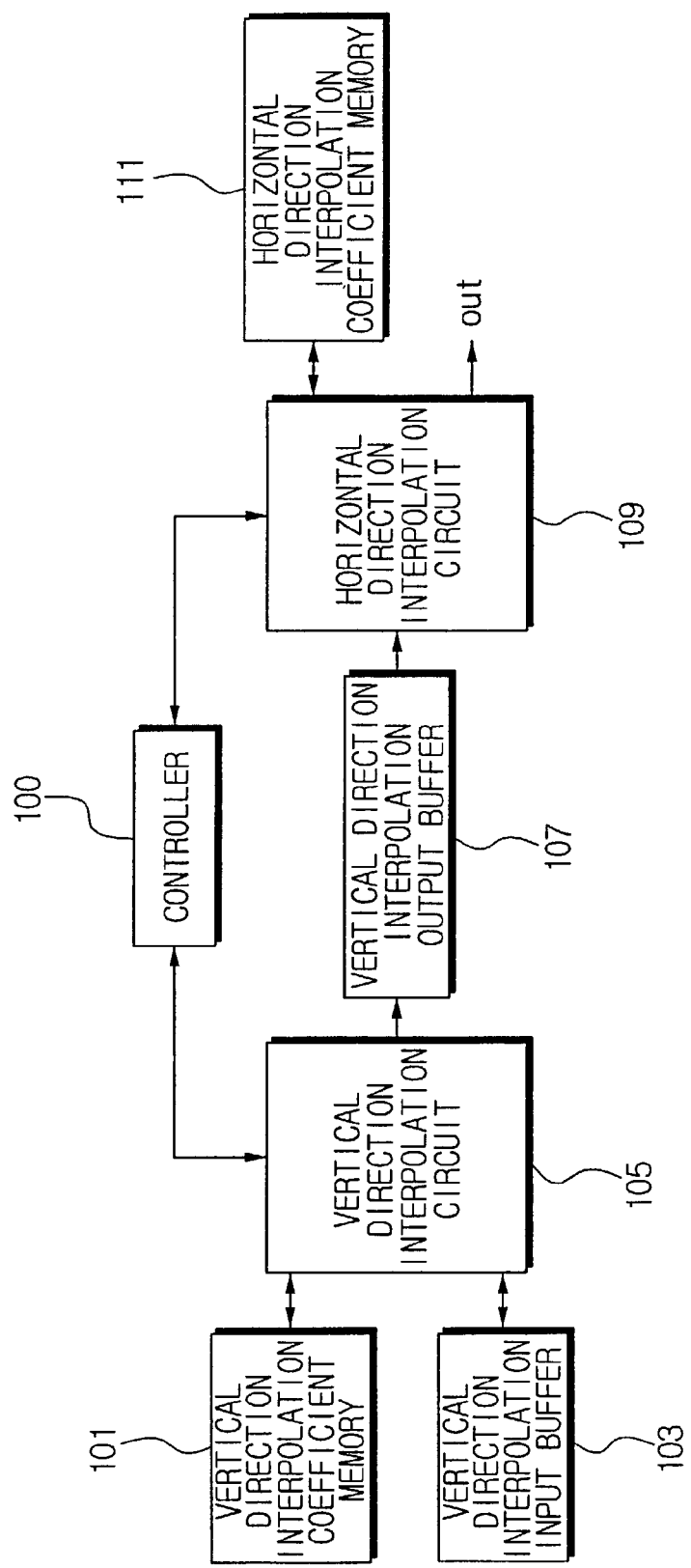
FIG. 1 is a schematic block diagram illustrating a conventional apparatus which processes a digital image.
Figure 2:
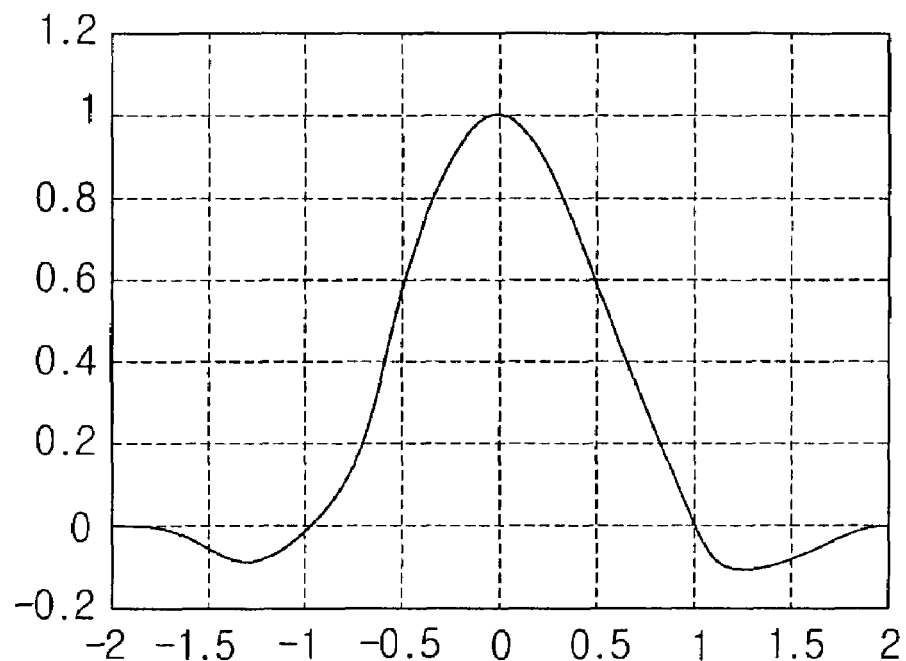
FIG. 2 is a graph illustrating waveforms of a cubic convolution of the apparatus shown in FIG. 1.
Figure 3:
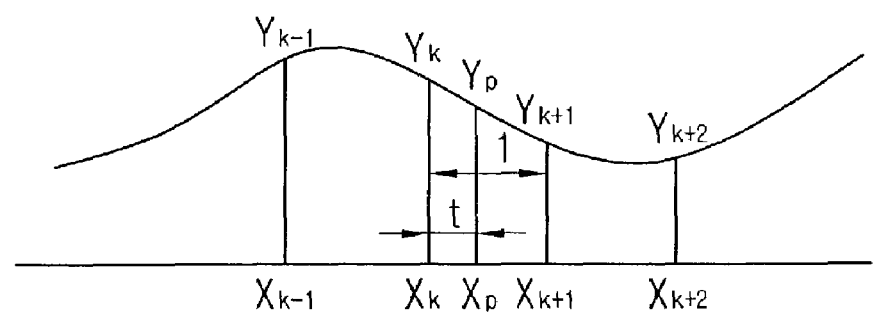
FIG. 3 is a graph explaining an interpolation method by the cubic convolution of FIG. 2.
Figure 4:
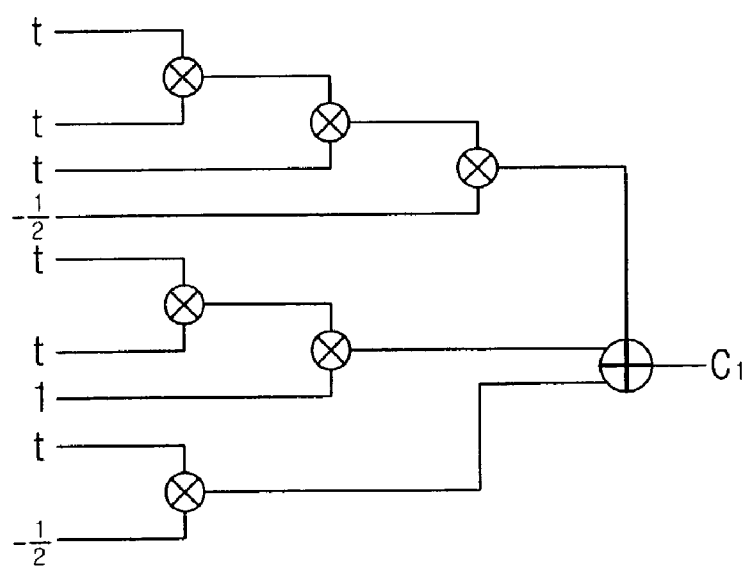
FIG. 4 is a diagram illustrating an example where one of the coefficients for an equation representing a position of an output pixel in the graph of FIG. 3 is embodied as adders and multipliers.
Figure 5:
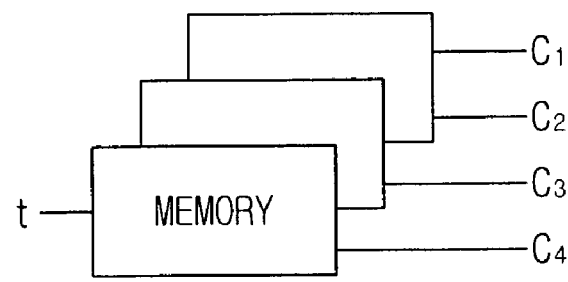
FIG. 5 is a diagram illustrating an example where the coefficient of the cubic convolution of FIG. 3 is embodied as banks.
Figure 6A:
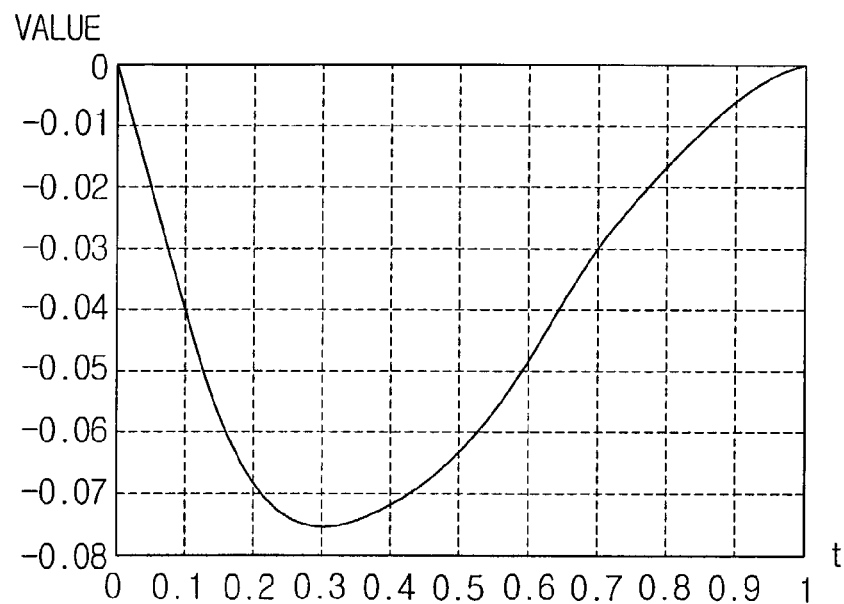
FIGS. 6A, 6B, 6C and 6D are diagrams illustrating an error distribution of the cubic convolution of FIG. 3.
Figure 6B:
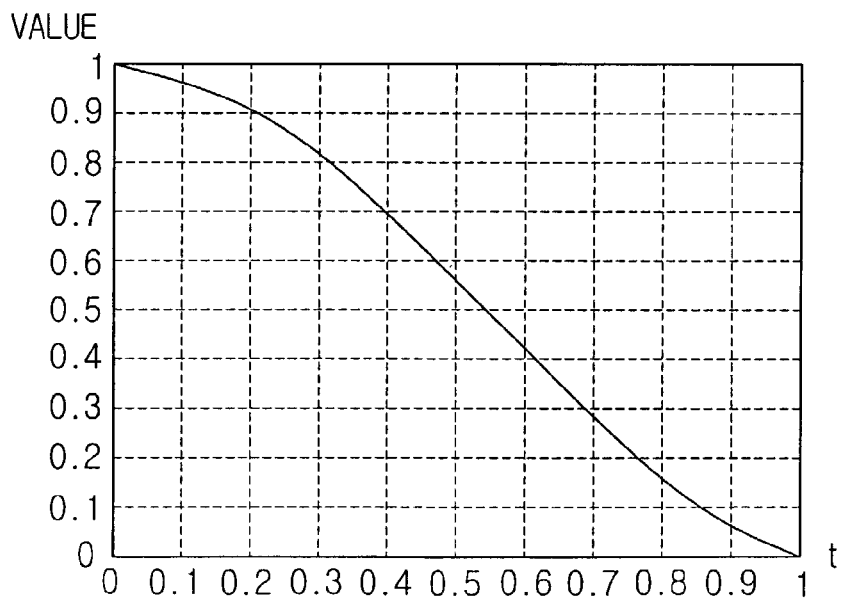
Figure 6C:
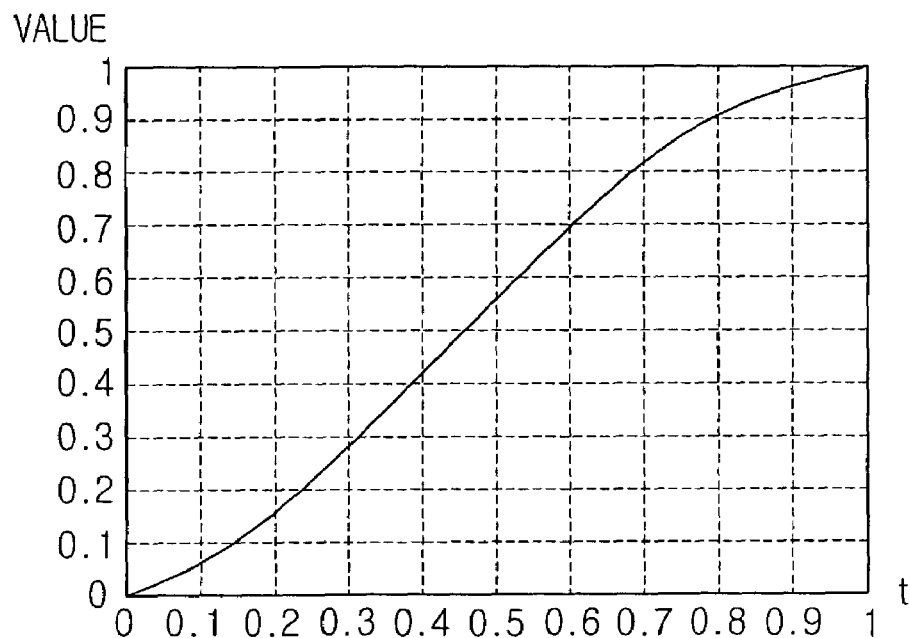
Figure 6D:
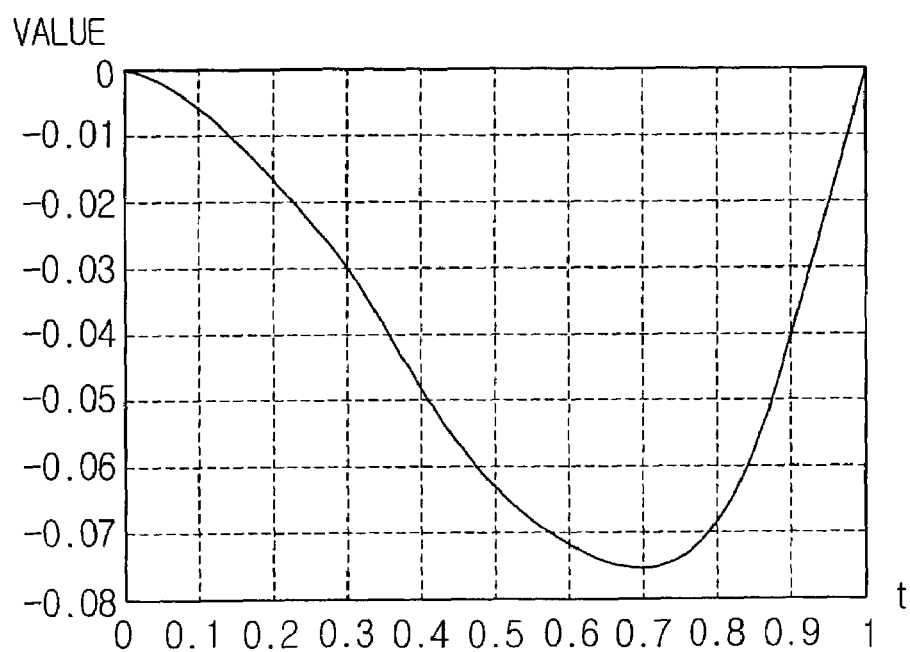
Figure 7:
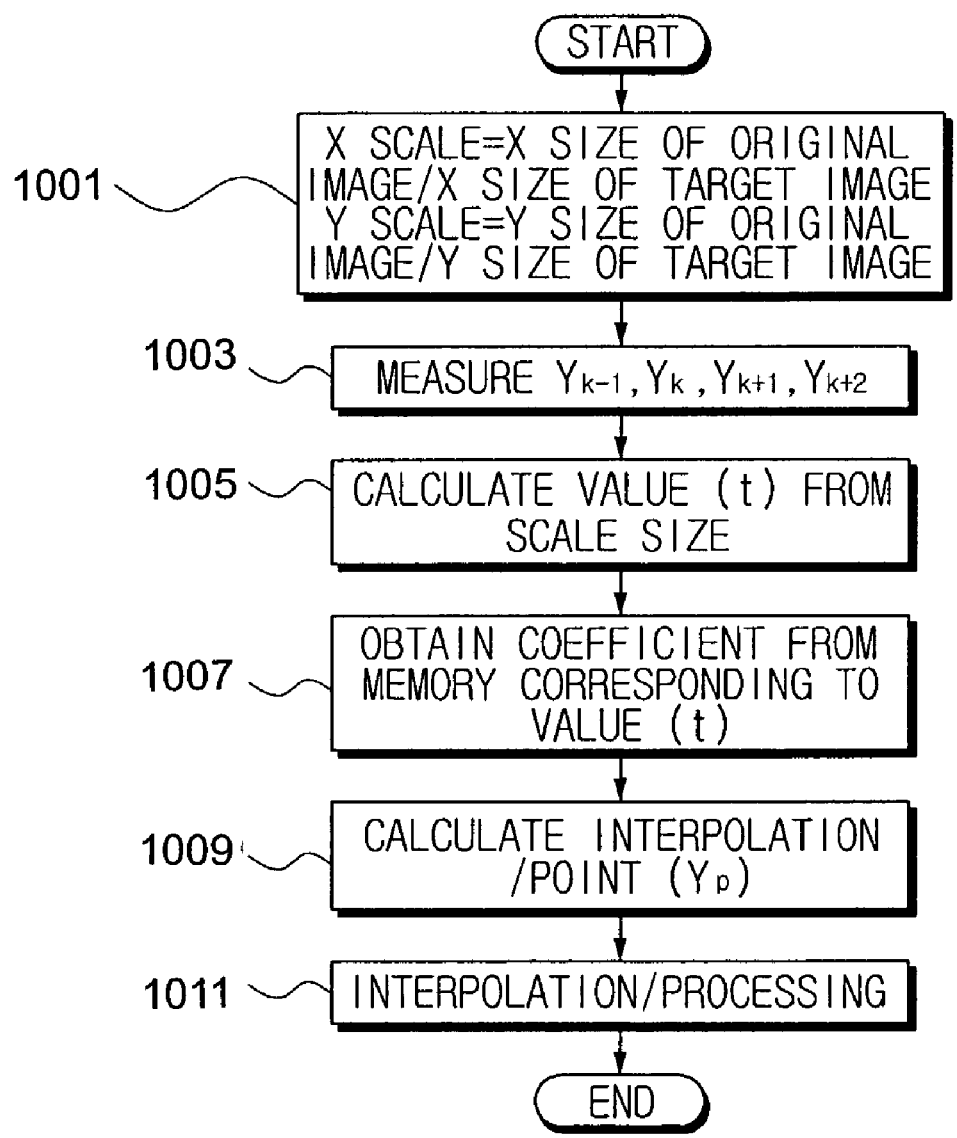
FIG. 7 is a flowchart illustrating a conventional method of processing a digital image.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 8:
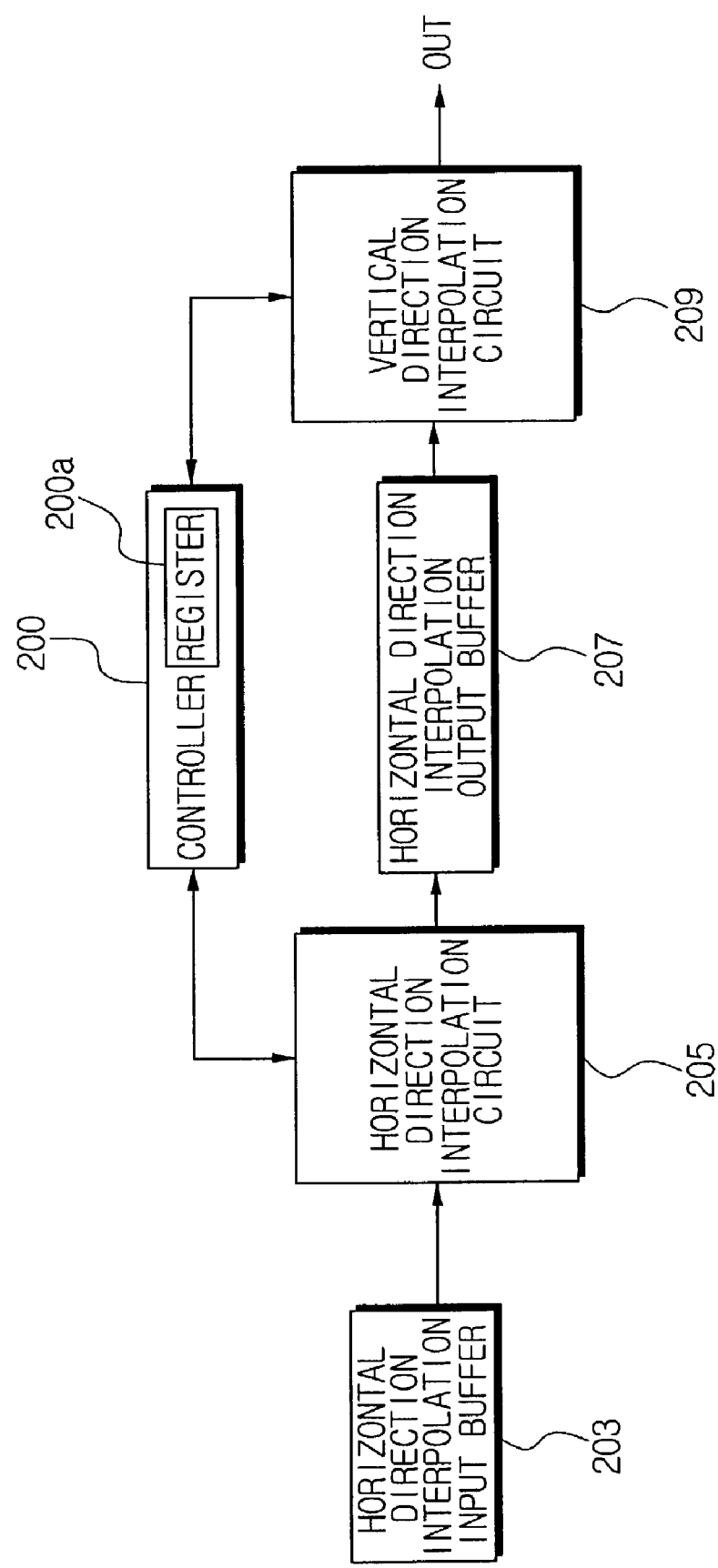
FIG. 8 is a schematic block diagram illustrating an apparatus which processes a digital image according to an embodiment of the present invention.
Figure 9A:
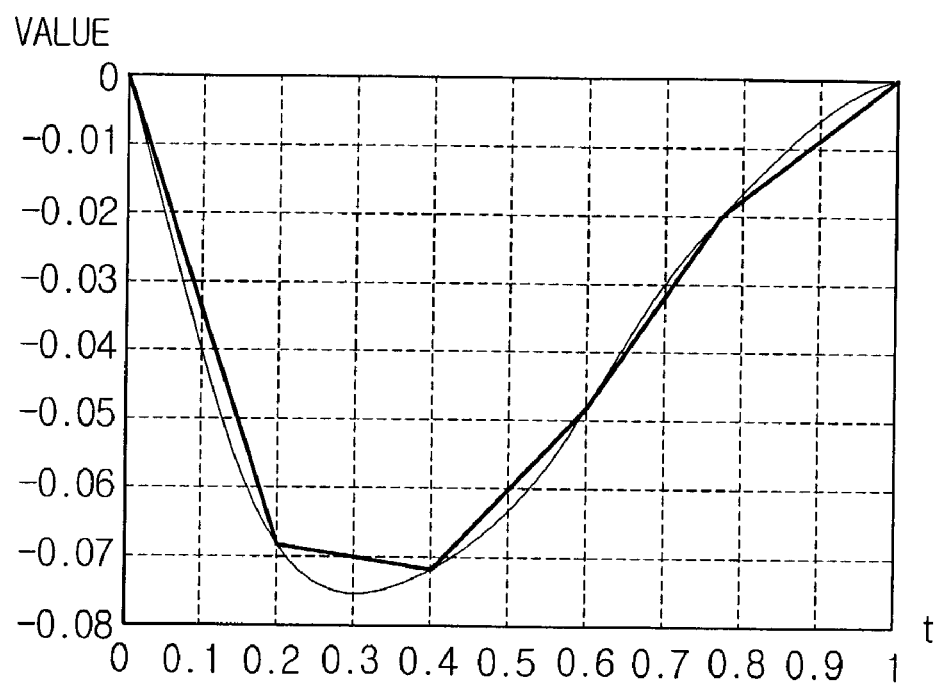
FIGS. 9A, 9B, 9C and 9D are diagrams illustrating linearity of errors where a coefficient of a cubic convolution of the apparatus shown in FIG. 7 is embodied as banks.
Figure 9B:
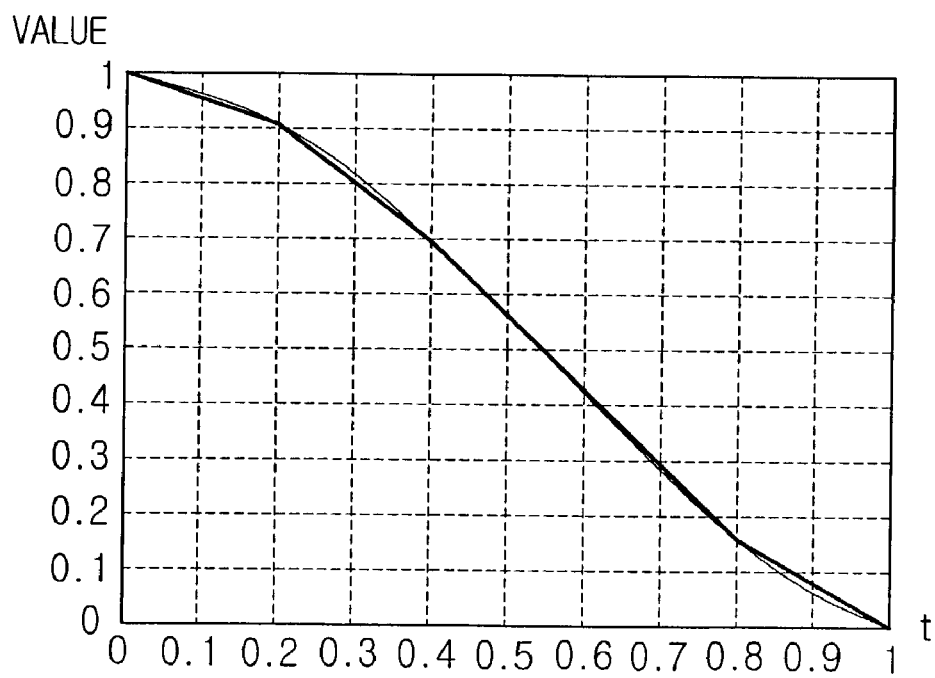
Figure 9C:
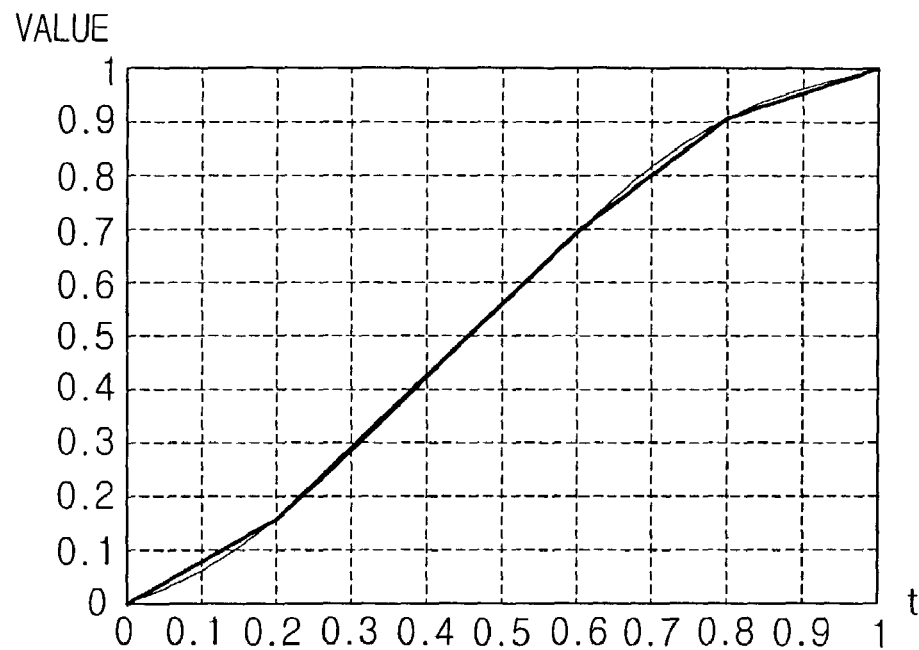
Figure 9D:
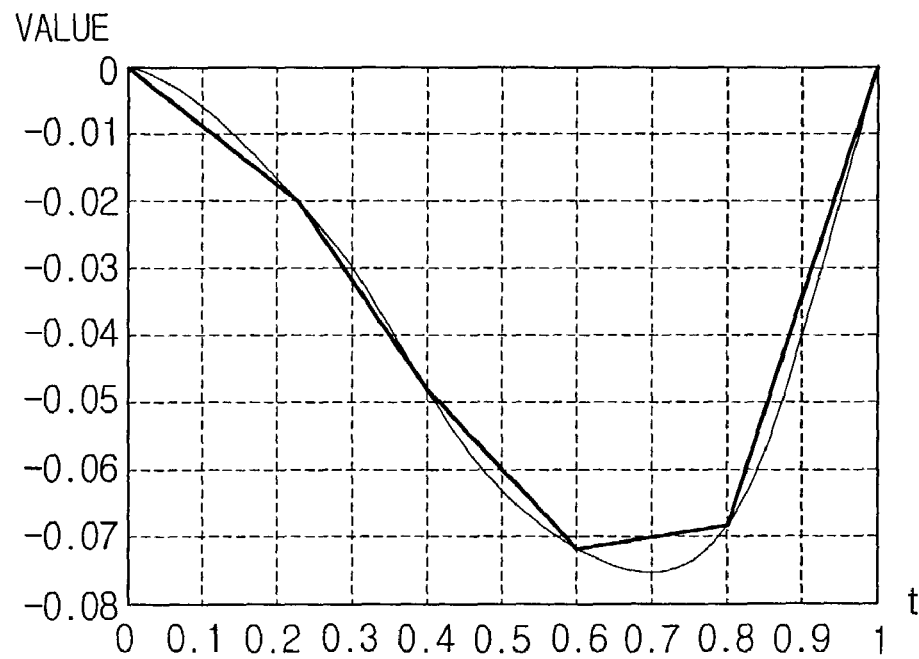

FIG. 8 shows an apparatus which processes a digital image according to an embodiment of the present invention. The apparatus includes a controller 200, a horizontal direction interpolation input buffer 203, a horizontal direction interpolation circuit 205, a horizontal direction interpolation output buffer 207, and a vertical direction interpolation circuit 209. The controller 200 includes a register 200a.

The controller 200 controls the horizontal direction interpolation input buffer 203, the horizontal direction interpolation circuit 205, the horizontal direction interpolation output buffer 207, and the vertical direction interpolation circuit 209, so as to interpolate pixel values of the input digital image. In addition, the controller 200 measures an interpolation interval (t) for the pixel values of the input digital image, and performs operations for interpolating the digital image by using the measured interpolation interval.

Since the horizontal direction interpolation input buffer 203, the horizontal direction interpolation circuit 205, the horizontal direction interpolation output buffer 207, and the vertical direction interpolation circuit 209 have a similar function as those shown in FIG. 1, explanations thereof are omitted to avoid repetition. However, the respective elements 203, 205, 207 and 209 have different processing procedures.

The register 200a is installed in the controller 200, and stores a coefficient equation. As illustrated in FIGS. 9A, 9B, 9C and 9D, the coefficient equation uses a relationship that errors have linearity when coefficients of a cubic convolution are embodied as banks. Here, FIGS. 9A through 9D are graphs showing $C_1$, $C_2$, $C_3$ and $C_4$, respectively.

That is, when a period for an X scale is divided by N banks, the period is divided into N periods. A range of the errors in the respective N periods is linear. When N is increased, the range of the errors has high linearity. As shown in FIGS. 9A through 9D, the errors of each period are represented by linear equations. A slight difference may be generated from the actual value due to linear expression as in the second period of $C_1$ and the fourth period of $C_4$. However, values of $C_1$ and $C_4$ are smaller than those of $C_2$ and $C_3$, and thus can be ignored. Moreover, the values of $C_1$ or $C_4$ have high linearity due to an increase of N.

When a number of the banks is N, linear equations as many as N*sampling number for the pixel values of the input digital image may be required. When the bank for the interpolation is determined, coefficients approximate to cubic convolution waveforms in the respective banks can be obtained by using the linear equations. That is, the linear equation is represented by 'aX+b'. Here, 'a' denotes a gradient and 'b' denotes an Y intercept. X is decided by the scale size. Thus, X has a value less than 1 in interpolation, and greater than 1 in decimation. Since the bank can be informed by using the interpolation interval (t) decided by the scale size, the error value can be reduced to a minimum value by using the previously-decided linear equation of the bank.

The above coefficient equation satisfies and is represented by Formula 7:

$$C_n(t)=a_{kn}t+b_{kn} \quad \text{<Formula 7>}$$

where $C_n$ denotes the coefficient of a variable of a position of an output pixel indicating an n-th input digital image in an equation representing the position of the output pixel which is the interpolation node, t denotes the interpolation interval, $a_{kn}$ is stored in a k-th register and represents a gradient of a straight line passing a position of an output pixel of an n-1th input digital image and the position of the output pixel of the n-th input digital image with respect to a predetermined interpolation interval, $b_{kn}$ is stored in the k-th register and represents an intersecting point between the straight line passing the position of the output pixel of the n-1th input digital image and the position of the output pixel of the n-th input digital image with respect to the predetermined interpolation interval and Y axis, and 'k=1, 2, 3, . . . , k, . . . ' and 'n=2, 3, 4, . . . , n, . . . .'

Figure 10:
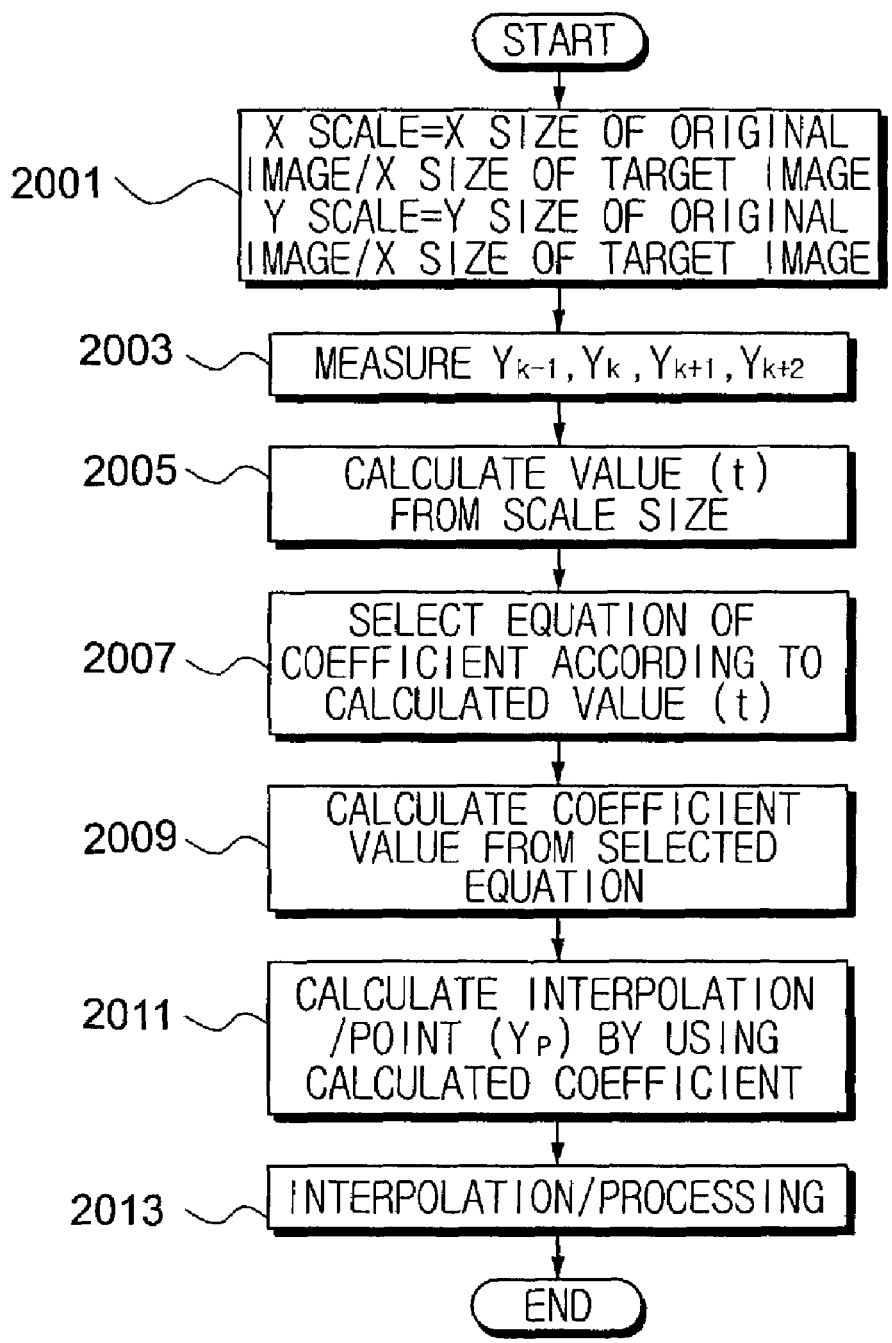
FIG. 10 is a flowchart illustrating a method of processing a digital image according to another embodiment of the present invention.

FIG. 10 shows a flowchart illustrating a method of processing the digital image according to the present invention. The operation of the apparatus as shown in FIG. 8 of the present invention will now be explained in detail with reference to FIG. 10.

The controller 200 calculates a size ratio of the pixel value of the input digital image to an aimed pixel value to be interpolated by the horizontal direction interpolation circuit 205 and the vertical direction interpolation circuit 209 in operation 2001. That is, when the horizontal direction is X and the vertical direction is Y, X scale is X size of the original digital image/X size of the aimed digital image, and Y scale is Y size of the original digital image/Y size of the aimed digital image.

After calculating X and Y scales, the controller 200 measures $Y_{k-1}$, $Y_k$, $Y_{k+1}$ and $Y_{k+2}$ in operation 2003. Here, $Y_{k-1}$, $Y_k$, $Y_{k+1}$ and $Y_{k+2}$ indicate positions of the k−1, k, k+1 and k+2-th sampled output pixels of the input digital image, respectively. After measuring $Y_{k-1}$, $Y_k$, $Y_{k+1}$ and $Y_{k+2}$, the controller 200 obtains 't' from the scale size in operation 2005. Here, 't' represents an X axis interval between the pixel value of the input digital image and the interpolation node, namely an interpolation interval. After calculating 't', the controller 200 obtains a corresponding coefficient equation from the register 200a according to 't' in operation 2007. As described above, the register 200a stores the coefficient equations for each coefficient in the interpolation node calculation equation, and is provided in the controller 200. The amount of information stored in the register 200a corresponds to the predetermined coefficient equations, thereby reducing a processing time of the controller 200.

The controller 200 calculates the coefficient from the coefficient equation in operation 2009, and obtains the interpolation node $Y_p$ by using the obtained coefficient in operation 2011. That is, the controller 200 transmits an interpolation node calculation signal to the horizontal direction interpolation circuit 205 and the vertical direction interpolation circuit 209, multiplies the coefficients from the register 200a by the pixel values of the inputted digital image, respectively, and calculates a sum of the resulting values, thereby performing the horizontal and vertical direction interpolations in operation 2013. The interpolation node calculation equation satisfies and is represented by Formula 8:

$$Y_p=Y_{n-1}C_{n-1}+Y_nC_n+Y_{n+1}C_{n+1}+Y_{n+2}C_{n+2} \quad \text{<Formula 8>}$$

where $Y_p$ denotes the interpolation node of the input digital image, $Y_n$ denotes a position of an n-th sampled output pixel of the input digital image, $C_n$ is the coefficient of the position of the n-th sampled output pixel of the input digital image, and 'n=2, 3, 4, . . . , n, . . . .'

The controller 200 interpolates the input digital image by using the calculated interpolation node in operation 2130. Accordingly, interpolation of the pixel values of the input digital image is completed.

The coefficient equation is represented by a linear equation according to the relationship that the range of the errors by N banks has linearity, thereby reducing the error of the interpolated value of the pixel value of the input digital image. In addition, when the present apparatus is embodied in a form of hardware, a large number of adders and multipliers is not needed, further simplifying the structure of the digital image processing apparatus. In the method of calculating the coefficient from the register 200a, storing the coefficient equation and obtaining the interpolation node, the coefficient equation is stored in the register 200a of the controller 200 to reduce the processing time of the controller 200.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An apparatus for processing a digital image, comprising:
   a register which stores a coefficient equation;
   an interpolation processing unit which interpolates the input digital image; and
   a controller which:
      measures an interpolation interval of pixel values of the digital image,
      calculates a coefficient by substituting the interpolation interval for the coefficient equation stored in the register,
      calculates an interpolation node for the digital image by substituting the coefficient, and an output pixel position value of the digital image for an interpolation node calculation equation, and controls the interpolation processing unit to interpolate the digital image to the interpolation node;

wherein the coefficient equation satisfies the following relationship:

$$C_n(t)=a_{kn}t+b_{kn}$$

where $C_n$ denotes the coefficient of a variable of a position of an output pixel indicating an n-th input digital image in an equation representing the position of the output pixel which is the interpolation node, t denotes the interpolation interval, $a_{kn}$ is stored in a k-th register and represents a gradient of a straight line passing a position of an output pixel of an n-1th input digital image and the position of the output pixel of the n-th input digital image with respect to a predetermined interpolation interval, $b_{kn}$ is stored in the k-th register and represents an intersecting point between the straight line passing the position of the output pixel of the n-1th input digital image and the position of the output pixel of the n-th input digital image with respect to the predetermined interpolation interval and Y axis, and 'k=1, 2, 3, k, . . .' and 'n=2, 3, 4, . . . , n, . . . .'.

2. The apparatus of claim 1, wherein the interpolation node calculation equation satisfies the following relationship:

$$Y_p=Y_{n-1}C_{n-1}+Y_nC_n+Y_{n+1}C_{n+1}+Y_{n+2}C_{n+2}$$

where $Y_p$ denotes the interpolation node of the input digital image, $Y_n$ denotes a position of an n-th sampled output pixel of the input digital image, and $C_n$ is the coefficient of the position of the n-th sampled output pixel of the input digital image.

3. A method of processing a digital image, the method comprising:

measuring an interpolation interval of pixel values of the input digital image;

calculating a coefficient by substituting the interpolation interval for a coefficient equation stored in a register;

calculating an interpolation node for the digital image by substituting the coefficient and an output pixel position value of the digital image for an interpolation node calculation equation; and controlling an interpolation processing unit to interpolate the digital image to the interpolation node;

wherein the coefficient equation satisfies the following relationship:

$$C_n(t)=a_{kn}t+b_{kn}$$

where $C_n$ denotes the coefficient of a variable of a position of an output pixel indicating an n-th input digital image in an equation representing the position of the output pixel which is the interpolation node, t denotes the interpolation interval, $a_{kn}$ is stored in a k-th register and represents a gradient of a straight line passing a position of an output pixel of an n-1th input digital image and the position of the output pixel of the n-th input digital image with respect to a predetermined interpolation interval, $b_{kn}$ is stored in the k-th register and represents an intersecting point between the straight line passing the position of the output pixel of the n-1th input digital image and the position of the output pixel of the n-th input digital image with respect to the predetermined interpolation interval and Y axis, and 'k=1, 2, 3, . . . , k, . . .' and 'n=2, 3, 4, . . . , n, . . . .'.

4. The method of claim 3, wherein the interpolation node calculation equation satisfies the following relationship:

$$Y_p=Y_{n-1}C_{n-1}+Y_nC_n+Y_{n+1}C_{n+1}+Y_{n+2}C_{n+2}$$

where $Y_p$ denotes the interpolation node of the input digital image, $Y_n$ denotes a position of an n-th sampled output pixel of the input digital image, and $C_n$ is the coefficient of the position of the n-th sampled output pixel of the input digital image.

5. The method of claim 4, wherein the coefficient equation is stored in the register and has linearity so as to reduce a processing time of the digital image and prevent errors in the interpolated digital image.

6. The method of claim 3, wherein the measuring of the interpolation interval comprises:

calculating a size ratio of the pixel values of the input digital image to aimed pixel values;

measuring positions of sampled output pixels of the input digital image; and obtaining the interpolation interval according to the size ratio and the positions of the sampled output pixels.

7. The method of claim 6, further comprising selecting the coefficient equation according to the interpolation interval among stored coefficient equations in the register for each coefficient in the interpolation node calculation equation.

8. The method of claim 7, wherein the coefficient equation is stored in the register and has linearity so as to reduce a processing time of the digital image and prevent errors in the interpolated digital image.

9. The apparatus of claim 1, further comprising:

a horizontal direction interpolation input buffer which stores the pixel values of the input digital image;

a horizontal direction interpolation circuit which performs a horizontal direction interpolation to the input digital image;

a horizontal direction interpolation output buffer which stores the pixel values of the input digital image that are interpolated in the horizontal direction interpolation circuit; and vertical direction interpolation circuit which performs a vertical direction interpolation to the input digital image.

10. The apparatus of claim 9, wherein the controller selects the coefficient equation according to the interpolation interval among stored coefficient equations in the register for each coefficient in the interpolation node calculation equation.

11. The apparatus of claim 10, wherein the coefficient equation is stored in the register and has linearity so as to reduce a processing time of the digital image and prevent errors in the interpolated digital image.

12. The apparatus of claim 1, wherein the coefficient equation and errors of the coefficient equation have linearity so as to reduce a number of adders and multipliers, where the coefficient equation is embodied in a form of hardware.

13. The apparatus of claim 1, wherein the register is stored in the controller.

14. The apparatus of claim 2, wherein the coefficient equation is stored in the register and has linearity so as to reduce a processing time of the digital image and prevent errors in the interpolated digital image.

15. A computer readable medium encoded with operating instructions for implementing a method of processing a digital image by a computer, the method comprising:

measuring an interpolation interval of pixel values of the input digital image;

calculating a coefficient by substituting the interpolation interval for a coefficient equation stored in a register data set;

calculating an interpolation node for the digital image by substituting the coefficient and an output pixel position value of the digital image for an interpolation node calculation equation; and controlling an interpolation processing unit to interpolate the digital image to the interpolation node;

wherein the coefficient equation satisfies the following relationship:

$$C_n(t) = a_{kn}t + b_{kn}$$

where $C_n$ denotes the coefficient of a variable of a position of an output pixel indicating an n-th input digital image in an equation representing the position of the output pixel which is the interpolation node, t denotes the interpolation interval, $a_{kn}$ is stored in a k-th register and represents a gradient of a straight line passing a position of an output pixel of an n-1th input digital image and the position of the output pixel of the n-th input digital image with respect to a predetermined interpolation interval, $b_{kn}$ is stored in the k-th register and represents an intersecting point between the straight line passing the position of the output pixel of the n-1th input digital image and the position of the output pixel of the n-th input digital image with respect to the predetermined interpolation interval and Y axis, and 'k=1, 2, 3, ..., k, ...' and 'n=2, 3, 4, ..., n, ....'.

16. The computer readable medium of claim 15, wherein the measuring of the interpolation interval comprises:

calculating a size ratio of the pixel values of the input digital image to aimed pixel values;

measuring positions of sampled output pixels of the input digital image; and obtaining the interpolation interval according to the size ratio and the positions of the sampled output pixels.

17. The computer readable medium of claim 15, further comprising selecting the coefficient equation according to the interpolation interval among stored coefficient equations in the register data set for each coefficient in the interpolation node calculation equation.

18. The computer readable medium of claim 15, wherein the interpolation node calculation equation satisfies the following relationship:

$$Y_p = Y_{n-1}C_{n-1} + Y_n C_n + Y_{n+1}C_{n+1} Y_{n+2}C_{n+2}$$

where $Y_p$ denotes the interpolation node of the input digital image, $Y_n$ denotes a position of an n-th sampled output pixel of the input digital image, and $C_n$ is he coefficient of the position of the n-th sampled output pixel of the input digital image.

* * * * *

UNITED STATES PATENT AND TRADEMARK OFFICE
CERTIFICATE OF CORRECTION

PATENT NO. : 7,110,620 B2
APPLICATION NO. : 10/226256
DATED : September 19, 2006
INVENTOR(S) : Woo-sung Shim et al.

It is certified that error appears in the above-identified patent and that said Letters Patent is hereby corrected as shown below:

Column 9, Line 24, change " 'k=1,2,3,k,...' " to --'k=1,2,3,…,k,...'--.

Column 12, Line 20, change "$Y_p=Y_{n-1}C_{n-1}+Y_nC_n+Y_{n+1}C_{n+1}Y_{n+2}C_{n+2}$" to --$Y_p=Y_{n-1}C_{n-1}+Y_nC_n+Y_{n+1}C_{n+1}+Y_{n+2}C_{n+2}$--.

Column 12, Line 23, change "he" to --the--.

Signed and Sealed this

Thirteenth Day of February, 2007

JON W. DUDAS
*Director of the United States Patent and Trademark Office*